(12) United States Patent
Prigent et al.

(10) Patent No.: US 12,196,201 B2
(45) Date of Patent: Jan. 14, 2025

(54) HYDRAULIC PRESSURE AMPLIFIER

(71) Applicant: POCLAIN HYDRAULICS INDUSTRIE, Verberie (FR)

(72) Inventors: Andre Prigent, Verberie (FR); Jean Heren, Verberie (FR); Benjamin Tenaud, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 312 days.

(21) Appl. No.: 16/954,974

(22) PCT Filed: Dec. 18, 2018

(86) PCT No.: PCT/EP2018/085636
§ 371 (c)(1),
(2) Date: Jun. 17, 2020

(87) PCT Pub. No.: WO2019/121770
PCT Pub. Date: Jun. 27, 2019

(65) Prior Publication Data
US 2020/0332781 A1    Oct. 22, 2020

(30) Foreign Application Priority Data

Dec. 18, 2017 (FR) ........................... 1762372

(51) Int. Cl.
*F04B 9/113* (2006.01)
*B60T 13/14* (2006.01)
(Continued)

(52) U.S. Cl.
CPC ............ *F04B 9/113* (2013.01); *B60T 13/145* (2013.01); *F04B 1/02* (2013.01); *F04B 5/02* (2013.01);
(Continued)

(58) Field of Classification Search
CPC .......... F04B 9/113; F04B 49/002; F04B 5/02; F04B 49/22; F04B 9/1053; F04B 49/06;
(Continued)

(56) References Cited

U.S. PATENT DOCUMENTS 2,970,546 A * 2/1961 White .................... F01L 25/08
92/162 R
5,496,099 A * 3/1996 Resch ................... B60T 8/4275
303/114.1
(Continued)

FOREIGN PATENT DOCUMENTS

CA        1015639 A      8/1977
DE   102012018724 A1    3/2014
(Continued)

OTHER PUBLICATIONS

Office Action received for European Patent Application No. 18826615.9, mailed on Feb. 8, 2022, 6 pages.
(Continued)

*Primary Examiner* — Peter J Bertheaud
(74) *Attorney, Agent, or Firm* — WOMBLE BOND DICKINSON (US) LLP (57) ABSTRACT

The present invention concerns a hydraulic pressure amplifier device comprising a casing (10) having two chambers (12, 14) of different cross-sections which house a staged piston (20) comprising two piston sections (22, 24) with cross-sections respectively el matching the chambers (12, 14), and means (30) for controlling the movement of the piston (20), characterised by the fact that the control means (30) are formed of an electronic control driven by means for estimating the ends-of-stroke of the piston (20) without an end-of-stroke sensor or mechanical stop.

12 Claims, 5 Drawing Sheets

(51) Int. Cl.
| | |
|---|---|
| *F04B 1/02* | (2006.01) |
| *F04B 5/02* | (2006.01) |
| *F04B 9/105* | (2006.01) |
| *F04B 49/00* | (2006.01) |
| *F04B 49/06* | (2006.01) |
| *F04B 49/12* | (2006.01) |
| *F04B 49/22* | (2006.01) |
| *F15B 3/00* | (2006.01) |

(52) U.S. Cl.
CPC .......... *F04B 9/1053* (2013.01); *F04B 49/002* (2013.01); *F04B 49/06* (2013.01); *F04B 49/12* (2013.01); *F04B 49/22* (2013.01); *F15B 3/00* (2013.01); *F04B 2201/0201* (2013.01); *F04B 2205/02* (2013.01); *F04B 2205/04* (2013.01)

(58) Field of Classification Search
CPC .............. F04B 49/12; F04B 2201/0201; F04B 2205/02; F04B 2205/04; B60T 13/145; F15B 3/00
See application file for complete search history.

(56) References Cited

U.S. PATENT DOCUMENTS

| | | |
|---|---|---|
| 2009/0317267 A1 | 12/2009 | Gill et al. |
| 2018/0149145 A1* | 5/2018 | Sato ........................ F04B 9/113 |

FOREIGN PATENT DOCUMENTS

| | | |
|---|---|---|
| DE | 102014214739 B3 | 12/2015 |
| EP | 3103691 A1 | 12/2016 |
| FR | 3020841 A1 | 11/2015 |
| GB | 0768258 A | 2/1957 |

OTHER PUBLICATIONS

International Preliminary Report on Patentability received for PCT Patent Application No. PCT/EP2018/085636, mailed on Jul. 2, 2020, 14 pages (7 pages of English Translation and 7 pages of Original Document).

International Search Report and Written Opinion received for PCT Patent Application No. PCT/EP2018/085636, mailed on Mar. 14, 2019, 16 pages (7 pages of English Translation and 9 pages of Original Document).

Preliminary Research Report received for French Application No. 1762372, mailed on Sep. 26, 2018, 2 pages (1 page of French Translation Cover Sheet and 1 page of original document).

Office Action received for European Application No. 18826615.9, mailed on Feb. 21, 2023, 16 pages (8 pages of English Translation and 8 pages of Original Document).

* cited by examiner

HYDRAULIC PRESSURE AMPLIFIER

The present invention relates to the field of hydraulic pressure generating devices.

More precisely, the present invention relates to the field of hydraulic pressure amplifiers.

The present invention finds application for example in the production of a hydraulic pressure amplifier intended to ensure the feeding of a reserve of hydraulic fluid under high pressure, allowing the actuation of the brakes of a vehicle, for example, but not restrictively, a trailer.

Different hydraulic pressure amplifier systems are known.

In particular, piston type hydraulic pressure amplifiers are known. Piston amplifiers of this type are available commercially, from the Minibooster company in particular.

Piston type hydraulic pressure amplifiers generally comprise a casing comprising two chamber with different cross sections which house a staged piston comprising two piston sections, the cross sections of which respectively match said chambers.

When a hydraulic pressure is applied in a low-pressure inlet chamber on the section with the large cross section of the piston, a higher pressure is obtained in an outlet chamber containing the section with the small cross section of the piston.

The pressure ratio between the pressure applied in the inlet chamber and the pressure prevailing in the outlet chamber is equal to the ratio between the cross sections of the two piston sections.

The piston is moved in translation in the casing, in successive reciprocating movements, by control by suitable detection valves mechanically controlled at the end of the piston's stroke, in combination with a bi-stable valve sensitive to the state of the detection valves which cyclically ensures the feeding and the discharge of the inlet chamber and the draining of the high-pressure outlet chamber.

The reversing of the movement of the piston relies on very accurate control of the operating clearances of the control slide valves integrated into the detection valves.

The movement control of the piston imposes successive cycles comprising the feeding of the inlet chamber to move the piston in a first direction to the high pressure chamber in order to obtain high pressure, then the discharge of the inlet chamber to move the piston in the opposite direction and return it to the original position, before initiating a new cycle.

Document FR 3 020 841 presents an end-of-stroke expander for a piston type pressure converter. As with all pressure converters known until the present, this document recommends using a position type position sensor.

Known pressure amplifier systems have already given good service.

However, they are complex, costly and lead to pressure pulses due, according to the analysis of the inventors, to a sudden inversion in the direction of movement of the piston.

The present invention has as its goal to propose a pressure amplifier system having greater performance than systems known from the prior art.

This goal is achieved according to the present invention thanks to a hydraulic pressure amplifying device comprising a casing including two chambers with different cross sections which house a staged piston comprising two piston sections with cross sections respectively matching the chambers and means for controlling the movement of the piston, characterized by the fact that the control means are formed of an electronic control driven by means for estimating the ends-of-stroke of the piston without an end-of-stroke sensor or mechanical stop.

According to other advantageous features of the invention:

the control means are formed by an electronic control driven by a time base. In this case, the estimation of the end-of-stroke is defined by the sequence imposed by the time base. This arrangement allows in particular limiting the number of components in the system.

the means of estimating the end-of-stroke of the piston comprise means of measuring the pressure on a port of the casing.

the means of estimating the end-of-stroke of the piston generate an end-of-stroke signal when the pressure measurement means detect a stable pressure over a predetermined period.

the means of estimating the end-of-stroke of the piston generate an end-of-stroke signal when the pressure measurement means detect a stable pressure equal to a reference pressure prevailing in the absence of movement of the piston.

the means of estimating the end-of-stroke of the piston measure the pressure at the inlet of the low-pressure inlet chamber for the extension phase of the piston.

the means of estimating the end-of-stroke of the piston measure the pressure at the inlet of the high-pressure outlet chamber for the retraction phase of the piston.

the means of estimating the end-of-stroke proceed with a pressure measurement by means of a flow restriction element, for example an atomizer.

the control means comprise a flow restriction, an atomizer for example, between a feed inlet and a distributor which controls the feed to the low-pressure inlet chamber of the casing, the control means comprise a flow restriction, an atomizer for example, between a feed inlet and the outlet chamber of the casing, the control means are driven by a time reference.

The invention also relates to vehicles equipped with an amplifier of the aforementioned type.

Moreover, the invention relates to a hydraulic pressure amplification method using a casing including two chambers with different cross sections which house a staged piston comprising two piston sections with cross sections respectively matching the chambers, characterized by the fact that is comprises the step consisting of controlling the movements of the piston by means of control means formed from an electronic control driven by means for estimating the end-of-stroke of the piston without a sensor or an end-of-stroke stop.

Other features, goals and advantages of the present invention will appear upon reading the detailed description that follows, and with reference to the appended drawings, given by way of non-limiting examples and in which:

FIG. 2 shows the general operation of a device conforming to the present invention in the context of control by control means formed from an electronic control driven by a time base; more precisely, FIG. 2a shows the opening cycles of a distributor controlling the feed to the amplifier casing, while

As previously indicated, according to an essential feature of the invention, the movement control means of the piston integrated with the hydraulic pressure amplifier are formed of an electronic control driven by means for estimating the ends-of-stroke of the piston.

More precisely, as will be described later, these control means comprise a distributor controlled electronically, and not by mechanical end-of-stroke stops.

What will be described first of all is a first embodiment conforming to the present invention according to which the movements of the slide valve of a control distributor and the consequent movements of the piston of a pressure amplifier are controlled on the basis of time and not by mechanical end-of-stroke detection, to limit the number of components of the system.

More precisely, in this case the time base predefines cyclically an imposed duration period of feed to the inlet chamber of the amplifier casing, then a discharge duration period imposed on the inlet chamber of the amplifier casing.

Figure 1:
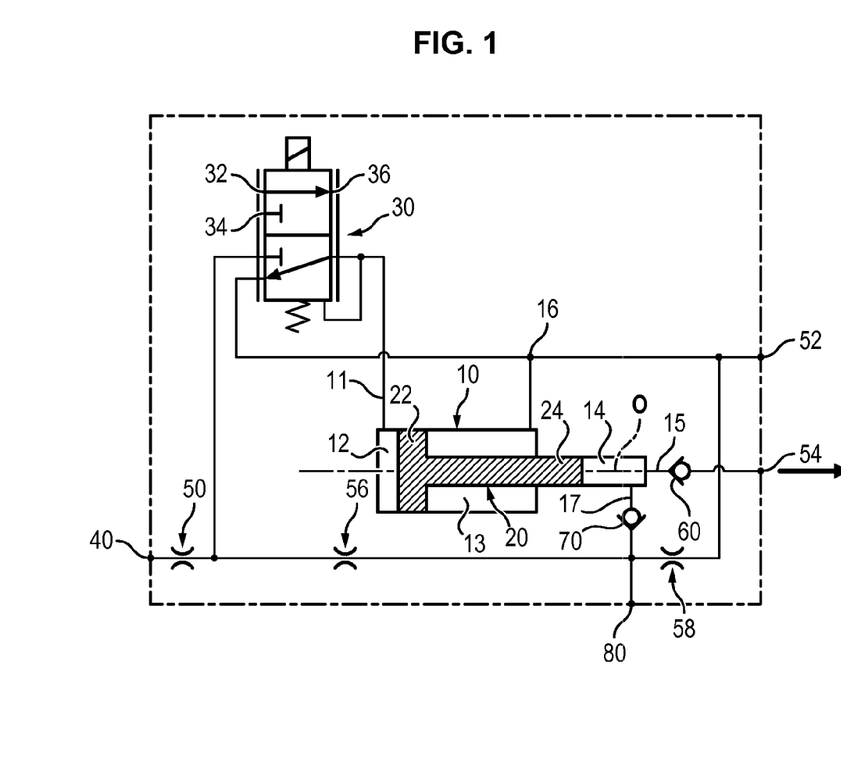
FIG. 1 shows a schematic view of the hydraulic circuit of a hydraulic pressure amplifying device conforming to the present invention.

As can be seen in the appended FIG. 1, the hydraulic pressure amplification device conforming to the present invention comprises a casing 10 which includes two main chambers 12, 14 which house a staged piston 20.

The first main chamber 12, which forms a low-pressure inlet chamber, has a constant cross section over its entire length.

The second main chamber 14, which forms a high-pressure outlet chamber, also has a constant cross section over its entire length. However, the right cross section of the second, high-pressure, main chamber 14 is smaller than the right cross section of the first, low-pressure, main chamber 12.

The staged piston 20 comprises two sections 22, 24 with cross sections respectively matching said chambers 12, 14.

The staged piston 20 is thus mounted in translation in the casing 10 along the longitudinal axis O-O of the casing 10.

More precisely still, the casing 10 defines an intermediate chamber 13 between the low-pressure inlet chamber 12 and the high-pressure outlet chamber 14. The intermediate chamber 13 has the same cross section as the low-pressure inlet chamber 12.

The first section 22 of the piston 20, with right cross section matching the low-pressure inlet chamber 12 and to the intermediate chamber 13, is thus mounted sliding in translation in the inlet 12 and intermediate 13 chambers.

The section 24 with a small cross section of the piston 20 is mounted in translation in the outlet chamber 14. It is also located in part in the intermediate chamber 13.

The volumes of the main chambers 12, 14 and of the intermediate chamber 13 are variable. The volumes of the intermediate chamber 13 and of the main outlet chamber 14 are reduced when the volume of the main inlet chamber 12 increases, and conversely.

Each of the chambers 12, 13, 14 has communication ports which allow, in alternation, the feed or the discharge of the corresponding chamber.

The low-pressure inlet chamber 12 has a port 11 which serves alternately as an inlet port for its feeding and outlet port for its discharge.

The high-pressure outlet chamber 14 has an outlet port 15 for its discharge and an inlet port 17 for its feeding.

The intermediate chamber 13 has a port 16 which serves alternately as an inlet port for its feeding and an outlet port for its discharge.

The device illustrated in FIG. 1 also comprises a control distributor 30.

The distributor 30 has as its function to control the feeding and the discharge of the low-pressure inlet chamber 12 and consequently the feeding and the discharge of the high-pressure outlet chamber 14.

The distributor 30 can be formed typically of a three port, two position valve.

In FIG. 1, these three ports have references 32, 34 and 36. The port 32 is an inlet port 32. The port 34 is an outlet port. The port 36 serves alternately as an outlet port during the feeding of the low-pressure inlet chamber 12 and an inlet port during discharge of the low-pressure inlet chamber 12.

The inlet 32 is connected to a fluid feed inlet 40, for example by means of a flow restriction 50, formed typically of an atomizer.

The inlet 40 can be supplied typically by a hydraulic pump, itself actuated by a main engine, for example a heat engine.

The port 34 is connected to the intermediate chamber 13 by means of the port 16 and to a reservoir by means of an output port 52.

The port 36 is connected to the low-pressure inlet chamber 12 by means of the port 11.

In a first position, the port 36 is connected to the inlet 32.

In a second position, the port 36 is connected to the outlet 34.

A second flow restriction 56, typically an atomizer, is placed between the outlet of the restriction 50 (or the point common to this restriction 50 and to the inlet 32 of the distributor 30) and a pressure measurement point 80.

A third flow restriction 58, typically an atomizer, is placed between the outlet of the second restriction 56 (or the point common to this restriction 56 and the pressure measurement point 80) and the outlet 52 connected to the reservoir.

The atomizer 58 is dimensioned to impose a very limited flow rate. It serves to create a permanent leak so that a pressure drop, consecutive for example to a breakage of the coupling between a tractor carrying the feeding means on the inlet port 40 and the trailer equipped with a braking device, is properly detected.

A check valve 60 is placed between the outlet 15 of the high-pressure outlet chamber 14 and an outlet 54 at which is available the high hydraulic pressure supplied by the device.

The check valve 60 is conducting in the direction of the outlet 15 of the casing toward the outlet port 54 and consequently opens when the pressure at the outlet 15 of the casing is greater than the pressure prevailing in the outlet port 54.

Another check valve 70 is placed between the inlet 17 of the high-pressure outlet chamber 14 and the point common to the atomizers 56 and 58 and to the measurement point 80.

The check valve 70 is conducting in the direction leading to the outlet chamber 14.

The check valve 70 consequently opens when the pressure in the chamber 14 becomes less than the pressure prevailing at the inlet of the valve 70.

In the original position, the low-pressure inlet chamber 12 is empty and the intermediate chamber 13 occupies its maximum volume.

When a fluid originating from the inlet port 40 is injected through the port 11 into the low-pressure inlet chamber 12 by means of the restriction 50 and the distributor 30 placed in the first position, the piston 20 is moved toward the outlet chamber 14. The low-pressure inlet chamber 12 expands and conversely the intermediate chamber 13 retracts.

Originally, the outlet chamber 14 occupies its maximum volume.

Once the piston 20 is moved by feeding the inlet chamber 12, the outlet chamber 14 occupies a minimum volume, but at high pressure, the fluid previously contained in the high-pressure outlet chamber 14 being discharged toward the outlet 54 by means of the check valve 60. The outlet chamber 14 can thus deliver a high-pressure fluid to the outlet port 15, and therefore to the outlet 54 by means of the check valve 60.

During this outgoing phase of the piston 20, the intermediate chamber 13 is progressively emptied into the reservoir through the port 16.

The inlet chamber 12 is thus defined between one end of a section with a large cross section of the casing 10 and the section 22 with a large cross section of the piston 20.

The intermediate chamber 13 is defined between the same section 22 with a large cross section of the piston 20 and the opposite end of the section with a large cross section of the casing 10.

The outlet chamber 14 is defined between the end of the section 24 with a small cross section of the piston 20 and the end facing the section with a small cross section of the casing 10.

In the second position of the distributor 30, the port 36 is connected to the outlet 34. Thus, the inlet chamber 12 is connected to the reservoir by means of the distributor 30 and the port 52, which allows the discharge of the inlet chamber 12 to the reservoir and the movement in the reverse direction of the piston 20 toward the inlet chamber 12.

The outlet chamber 14 is then supplied through the check valve 70 connected to the inlet port 40, by means of the aforementioned atomizers 50 and 56.

During this return phase of the piston 20, the intermediate chamber 13 is progressively filled by the fluid present in the inlet chamber 12 by means of the distributor 30, via the port 16.

Within the context of the first embodiment conforming to the present invention, the movements of the slide valve of the distributor 30 are driven by a time base and not by end-of-stroke mechanical information as was the case in the solutions known from the prior art.

The arrangement conforming to the present invention allows limiting the number of components as compared with known solutions.

Figure 2A:
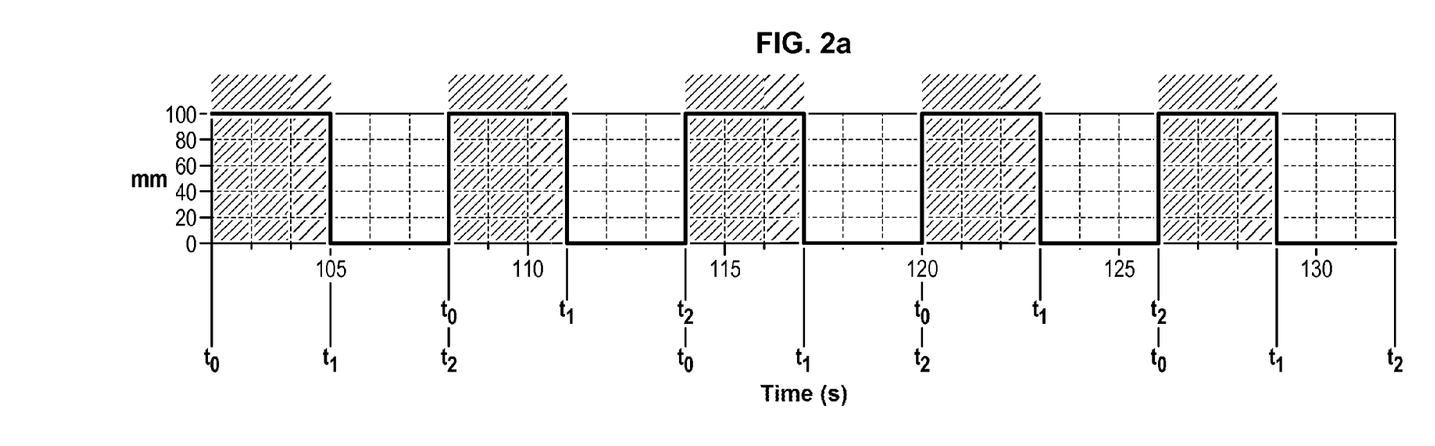

Observed in FIG. 2a are the signals defining the opening slots of the distributor 30, i.e. the slots imposed by a time base during which the port 36 is connected to the inlet 32 to allow the feeding of the inlet chamber 12 with the fluid originating in the feed inlet port 40.

In FIG. 2a are shown the control cycles corresponding to an opening of the distributor 30 (connection of the port 36 to the inlet 32) between the instants t0 and t1 and conversely to a closing of the distributor 30 (connection of the port 30 with the outlet 34) during the time phases between t1 and t2.

Once a cycle from t0 to t2 is accomplished, a following cycle repeating the opening periods t0 to t1, then closing from t1 to t2, is reiterated, and so on.

Figure 2B:
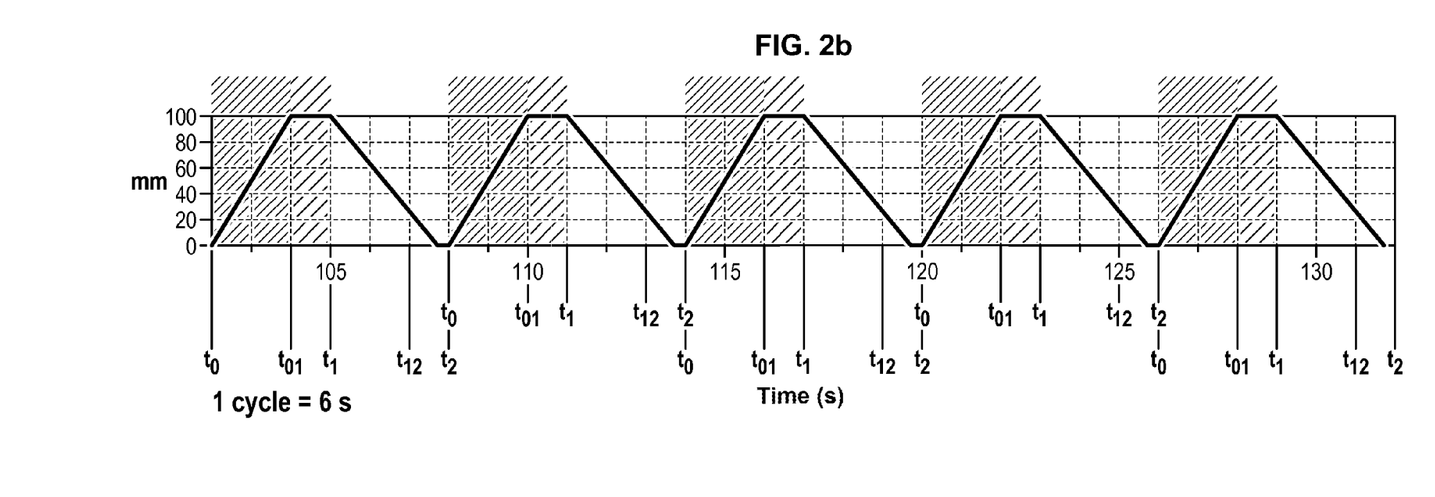
FIG. 2b shows the cycles of movement of the piston.

Also shown in FIG. 2b are the movement cycles of the piston 20.

The piston 20 is moved in the expansion direction of the chamber 12 between instants t0 and t01, during the opening of the distributor 30. Then, the piston 20 having reached the end of its stroke in expansion, remains immobile between instants t01 and t1 which correspond to the end of the opening of the distributor 30.

The piston 20 is then moved in the direction of retraction of the inlet chamber 12 between instants t1 and t12, the instant t12 coinciding with the end-of-stroke of the piston 20 in retraction.

The piston 20, having reached the end of its stroke in retraction, then remains immobile between instants t12 and t2, the instant t2 with the resumption of an opening cycle of the distributor 30 at instant to.

The cycle from t0 to t2 of the movement of the piston 20 is then repeated in synchronism with the opening and the closing of the distributor 30 as illustrated in FIG. 2b.

The extension phases of the piston 20 between instants t0 and t01 and the retraction phases of the piston 20 between instants t1 and t12, are preferably operated at a constant movement speed of the piston 40 by command from the distributor 30.

It will be noted upon examining FIGS. 2a and 2b that the opening time of the distributor 30 allowing feeding the inlet chamber 12 between t0 and t1 and the closing time of the port 32 of the distributor 30 between t1 and t2 are greater than the time from t0 to t01 and from t1 to t12 required for ensuring complete stroke of the piston 30, respectively extension and return.

More precisely, it will be noted upon examination of FIGS. 2, that the opening time between t0 and t1 of the distributor 30 is greater than the time between t0 and t01 required to ensure the full expansion of the piston 20 while the period from t1 to t2 of closing of the port 32 of the distributor 30 is greater than the period from t1 to t12 required to ensure the retraction of the piston 20.

By way of a non-limiting example, a complete cycle from t0 to t2 can last 6 seconds for example.

A person skilled in the art will understand that, in the context of this first embodiment, the distributor 30 is therefore driven by the time base defined by the opening cycles imposed from t0 to t1 and the closing cycles imposed from t1 to t2.

In this case, end-of-stroke estimations controlling the distributor 30 are defined by the sequence imposed by the time base, i.e. the instants t0, t1 and t2. More precisely, the end-of-stroke estimations controlling the distributor 30 are defined by the duration period imposed by the time base, for feeding the inlet chamber of the amplifier casing which ends at instant t1, then the duration period imposed by the time base, for discharging the inlet chamber of the amplifier casing, which ends at instant t2.

According to the first embodiment conforming to the present invention, the piston 20 end-of-stroke estimations therefore correspond to the predefined instants t1 and t2 imposed by the time base.

A second embodiment conforming to the present invention will now be described, according to which the distributor 30, associated with the restriction 50, controls the feed to the low-pressure inlet chamber 12 by proportional control, so that the piston 20 does not generate pulses on the inlet 11 and outlet 15 openings and consequently on the inlet 40 and outlet 54 openings. In this embodiment, the distributor is controlled on the basis of a pressure measured at the port 80.

This pressure measurement has as its goal to give a signal representing the level of pressure on a port of the amplifier casing allowing detecting when the piston 20 is immobilized and consequently has arrived at the end of its stroke.

Proportional control allows avoiding too high an acceleration of the piston 20 which could lead to rapidly consuming all the flow rate available at the inlet 40 and could lower the pressure during the movement of the piston 20, which could consequently generate vibrations.

This control would allow ensuring both a rapid stroke of the piston 20 and avoiding overconsumption on the feed line 40.

The pressure measurement can be carried out by means of any conventional pressure sensor installed at the measurement opening 80.

The atomizer 50 installed on the inlet line between the inlet port 40 and the port 32 of the distributor 30 allows, thanks to the sensor placed at the port 80, measuring on the one hand the pressure level available on the inlet 11 of the low-pressure inlet chamber 12 when the piston 20 is immobile and the pressure level at the same inlet 11 of the low-pressure inlet chamber 12 when the piston 20 is moved in translation in extension.

The deviation between these two pressure measurements represents an image of the flow rate consumed by the casing to feed the low-pressure inlet chamber 12.

Thus, when the pressure measured at the point 80, during the feed phase of the inlet chamber 12, becomes equal to the reference pressure existing when the piston 20 is immobile, the system estimates that the piston has arrived at the end of its feed stroke or extension.

It will be noted that, during the exit of the piston 20, the atomizer 56 does not impact the measurement of the pressure at the inlet atomizer 50 collected at the measurement point 80 because the flow through the atomizer 56 is very low.

This is due in particular to the fact that the outlet atomizer 58 is very small, as indicated previously.

The movement speed in extension of the piston 20, which depends on the flow rate injected into the inlet chamber 12, is controlled by the size of the atomizer 50.

The exit speed of the piston 20 is calculated based on the pressure difference measured between the pressure level available without piston 20 movement and the pressure measured with the atomizer 50 when the piston 20 is moved in extension.

The same control principle applies to the return of the piston 20, i.e. the movement of the piston 20 in the retraction direction.

The atomizer 56 installed on the line comprising the atomizer 50, between the inlet port 40 and the check valve 70 allows, thanks to the sensor placed at the port 80, measuring on the one hand the pressure level available at the inlet 17 of the high-pressure outlet chamber 14 when the piston 20 is immobile and the pressure level at the same inlet 17 of the high-pressure chamber 14 when the piston 20 is moved in translation in retraction.

The deviation between these two pressure measurements represents an image of the flow rate consumed by the casing to feed the high-pressure chamber 14 in the retraction phase of the piston 20.

Thus when the pressure measured at point 80, during a feed phase of the outlet chamber 14, becomes equal to the reference pressure existing when the piston 20 is immobile, the system estimates that the piston has arrived at the end of its retraction stroke.

The return speed of the piston 20 is calculated based on the pressure difference measured between the pressure level available without movement of the piston 20 and the pressure measured with the atomizer 56 when the piston 20 is moved in retraction.

The movements of the piston 20 are therefore monitored by a pressure measurement on the outlet of the atomizer 50 for the extension phase of the piston 20, during which the system applies a pressure setpoint to the low-pressure inlet chamber 12, and by a pressure measurement on the outlet of the atomizer 56 for the returning phase of the piston 20, during which the system applies a pressure setpoint to the high-pressure outlet chamber 14.

Prepositioning a pressure setpoint on the low-pressure inlet chamber 12 can be accomplished by taking into account the desired pressure at the outlet opening 54 and the surface area ratio between the two sections 22 and 24 of the piston 20.

If a desired outlet pressure Pout of 120 bars is taken at the outlet port 54, and a surface ratio of 10 between the two sections 22, 24 of the piston 20, the control pressure for equilibrium at the inlet 11 of the inlet chamber 12 is 12 bars. It is therefore possible to provide a distributor 30 controlling the outlet pressure 36 at 12 bars.

The prepositioning of the pressure setpoint at the low-pressure inlet chamber 12 can be accomplished thanks to a suitable valve 30. Shown in FIG. 3 is an exemplary embodiment of a valve 30 of this type.

Figure 3:
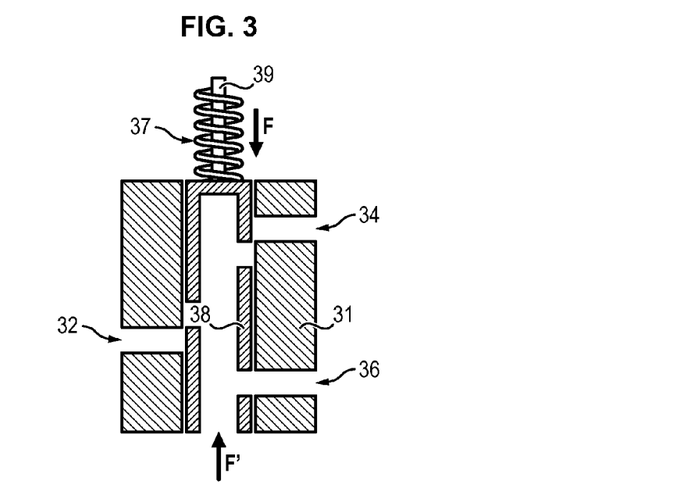
FIG. 3 shows schematically, according to a longitudinal section view, a valve allowing controlling the inlet pressure of the device conforming to the present invention, FIG. 4 show shows the movement cycles of the piston as a function of the pressure measured at the outlet of an atomizer of the installation.

The valve 30 shown in FIG. 3 forms a pressure reducer. It comprises a body 31 which houses a slide valve 38. The body 31 comprises the aforementioned ports 32, 34 and 36.

The movements of the slide valve 38 in the body 31 are controlled by an electromagnetic force generated by a coil 37 which cooperates with a plunger 39 secured to the slide valve 38.

To a given control current on the coil 37 corresponds an outlet pressure at the opening 36, because the valve 30 includes a hydraulic counter-reaction which recloses the slide valve 38 when the pressure is attained.

F is the electromagnetic force which corresponds to a current injected into the coil 37. The pressure available at the outlet 36 applies to the entire internal surface area of the slide valve 38 and therefore creates a force F', which corresponds to a hydraulic force which opposes F. When F' increases, the slide valve 38 closes the inlet opening 32 with no change in the control current F in the coil 37.

The valve 30 shown in FIG. 3 therefore imposes a pressure of 12 bar on its outlet 36 to preposition the set point on the low-pressure inlet chamber 12.

If the inlet pressure P available at the outlet of the means applying pressure to the inlet 40 is 20 bars, however, it is possible to increase the control pressure applied to the inlet 11 of the inlet chamber 12 from 12 bars to 20 bars, possibly until 20 bars, to accelerate the piston 20. It is sufficient for this purpose to accordingly control the valve 30.

The invention is not limited to the use of a valve 30 of the type illustrated in FIG. 3 comprising a hydraulic counter-reaction and allowing prepositioning of pressure. The invention can use other types of proportional valves 30 which do not have a hydraulic counter-reaction of this type.

There exist for example proportional valves which have no correspondence between a control current and an outlet pressure, but between a current and an opening cross section. In this case, prepositioning of pressure is not possible and, in the context of the invention, the acceleration of the piston is then managed solely by comparing the pressure of the opening 80 prior to the beginning of movement, and this same pressure during movement as explained above.

Without prepositioning, the opening phase of the valve 30 is more delicate. So as not to collapse the pressure it is necessary to start the piston gently. If the control current of the coil 37 is increased too fast, the piston or the slide valve 38 moves too quickly.

In the second embodiment, as indicated previously, the simulation of end-of-stroke detection is linked to the end of the pressure deviation measured on the atomizers 50 or 56, depending on whether the piston 20 is exiting or returning, relative to a reference pressure established when the piston 20 is immobile.

In fact, the pressure remains stable and constant, equal to the reference pressure, when the piston 20 remains immobile.

The movement speed in retraction of the piston 20 is controlled, on the one hand, by the size of the atomizers 50 and 56 placed in series and which control the flow rate injected into the outlet chamber 14 from the port 40, and on the other hand by the head losses imposed by the distributor 30 through which the flow discharged from the inlet chamber 12 to the reservoir via the port 54 transits.

It will be noted, however, that if the control valve or distributor 30 has a head loss level greater than a threshold, the atomizer 56 does not intervene in the regulation of the speed of the piston in its return stroke. In this case, in fact, the head loss necessary for controlling the return phase of the piston 20 is due to the distributor 30 itself and the speed of the piston 50 is limited only due to head losses in the control valve 30.

Figure 4:
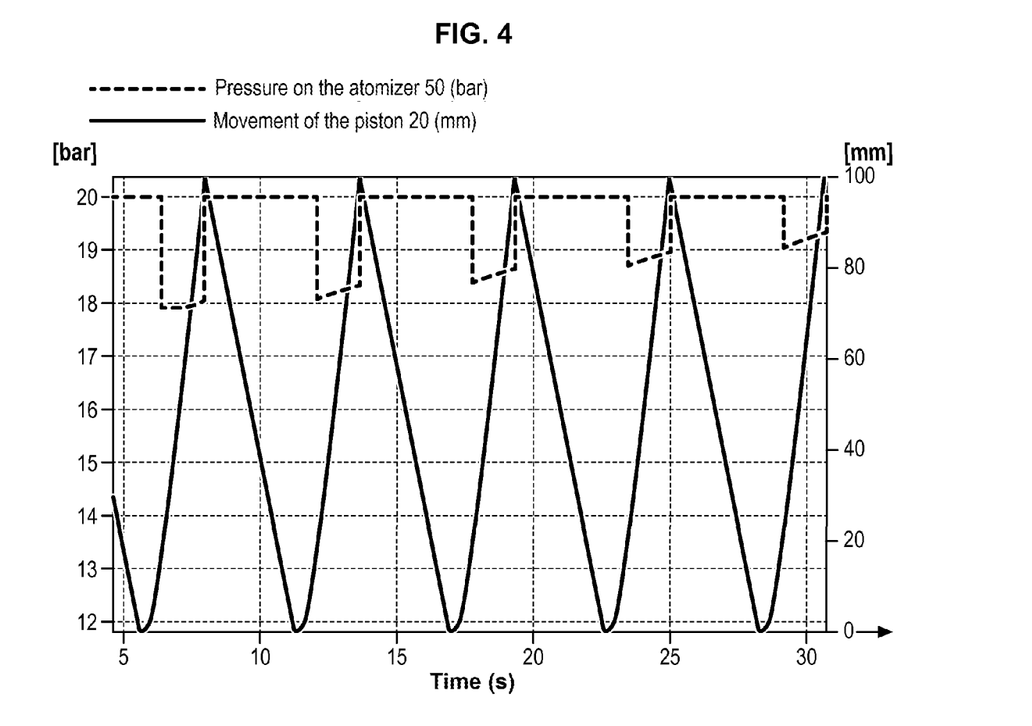

FIG. 4 shows the movement cycles of the piston 20 as a function of a pressure measured on the atomizer 50.

As can be seen in FIG. 4, the pressure measured on the atomizer 50 grows progressively during the progress of the hydraulic pressure amplification process due to the growing counter-pressure applied to the outlet 54.

Figure 5:
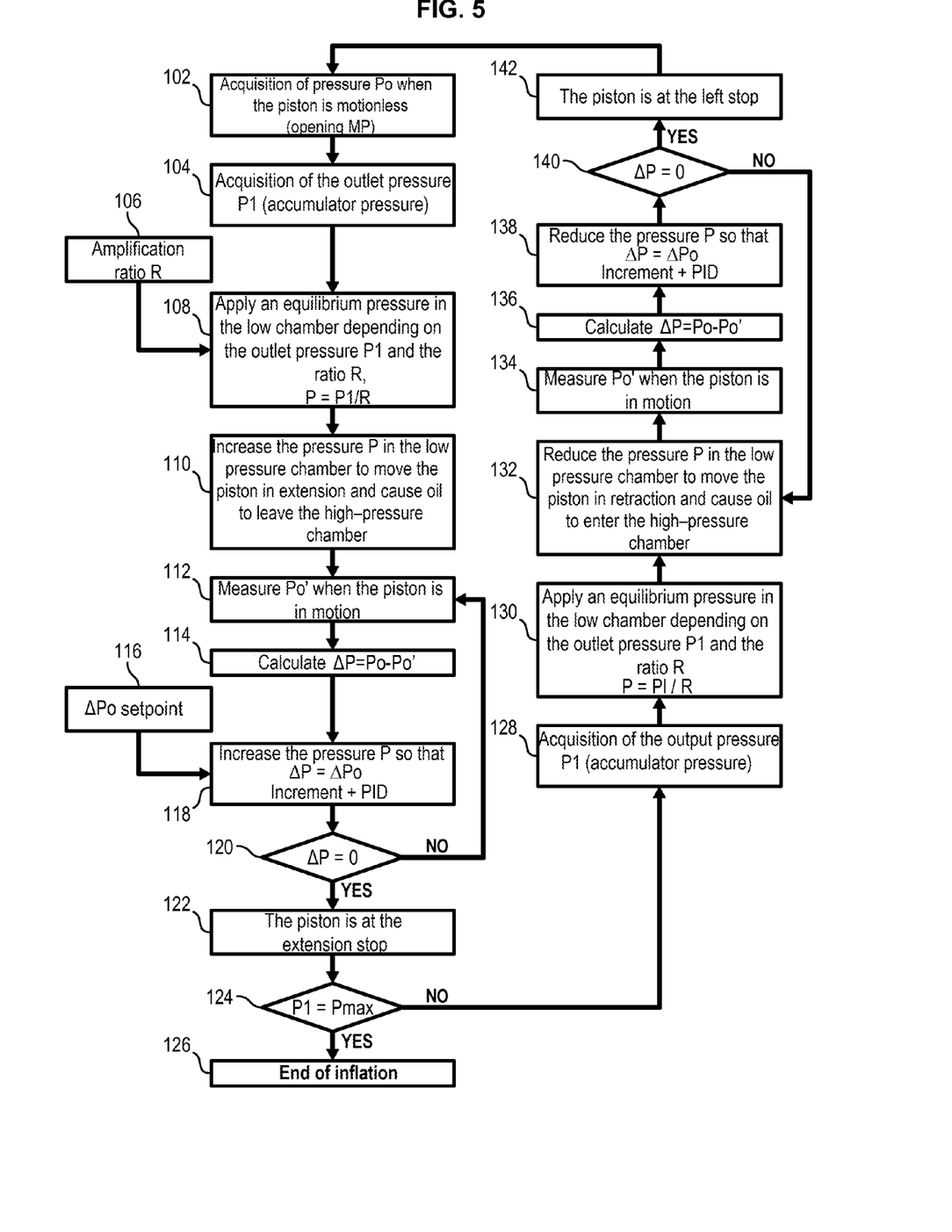
FIG. 5 shows a flowchart of the operation of the device conforming to the present invention in the control by a measured pressure.

FIG. 5 shows a flowchart of operation of the device in the context of the second embodiment conforming to the present invention.

Observed in this FIG. 5 is a method 100 which comprises the following steps:

Acquiring an inlet pressure Po when the piston 20 is immobile, preferably by measuring the pressure on the atomizer 50 accessible at the measurement opening 80 (the atomizer 56 having no impact on this measurement) (step 102), Acquiring the pressure P1 prevailing in the accumulator connected to the high-pressure outlet 54 (step 104), Defining the ratio between the cross sections of the two sections 22 and 24 of the piston 20 which corresponds to the pressure amplification ratio (step 106), Applying an equilibrium pressure P to the low-pressure inlet chamber 12 so that P=P1/R (step 108), Increasing the pressure P in the low-pressure inlet chamber 12 to move the piston 20 toward the outlet chamber 14 and cause oil to leave the high-pressure chamber toward the accumulator via the outlet port 54 (step 110), Acquiring the pressure Po' at the atomizer 50 when the piston 20 is mobile, by measuring the pressure on the atomizer 50 accessible at the measurement opening 80 (the atomizer 56 having no impact on this measurement) (step 112), Calculating the pressure deviation $\Delta P=Po-Po'$ (step 114), Defining a pressure setpoint $\Delta Po$ (step 116), Increasing the pressure P in the low-pressure inlet chamber 12 so that $\Delta P=\Delta Po$ by successive increments and control of the PID type (step 118), Performing a test determining whether $\Delta P=0$ (step 120); if not, continuing the process at step 112, If, on the contrary, the test of step 120 is positive, consider that the simulation of reaching the end-of-stroke of the piston 20 in extension is validated (step 122), Performing a test determining whether P1=Pmax (step 124), If the test of step 124 is positive, consider that the method has attained the end-of-inflation stage (step 126), If, on the contrary, the test of step 124 is negative, the piston 20 having reached its end-of-stroke stop in extension without attaining the setpoint pressure in the accumulator, continue the process by a series of steps controlling the return sequence of piston 20 and starting with a step which consists of acquiring the new pressure value P1 prevailing in the accumulator connected to the high-pressure outlet 54 (step 128), Applying an equilibrium pressure P to the low-pressure inlet chamber 12 so that P=P1/R (step 130), Reducing the pressure P in the low-pressure inlet chamber 12 to retract the piston 20, cause oil to leave the low-pressure chamber 12 and cause oil to enter the high-pressure chamber 14 via the inlet port 17 (step 132), Acquiring the pressure Po' at the atomizer 56 when the piston 20 is mobile, by measuring the pressure accessible at the measurement opening 80 (step 134), Calculating the pressure deviation $\Delta P=Po-Po'$ (step 136), Reducing the pressure P in the low pressure inlet chamber 12 so that $\Delta P=\Delta Po$ by successive increments and control of the PID type (step 138), Performing a test determining whether $\Delta P=0$ (step 140); if not, continue the process at step 134, If, on the contrary, the test of step 140 is positive, consider that the simulation of reaching the end-of-stroke of the piston 20 in retraction is validated (step 142), but the setpoint pressure in the accumulator was not reached (see earlier step 124), repeat the process by the series of steps intended to control the exit sequence of the piston 20 starting with the aforementioned step 120.

In the case where a distributor 30 is used formed of a proportional valve and not a controlled flow restrictor of the type illustrated in FIG. 3, the aforementioned steps 108 and 130 are omitted.

The third embodiment conforming to the present invention will now be described.

According to this third embodiment, the movement of the piston 20 is controlled by a time reference based on an available flow rate. More precisely, the time reference for the feed phase is defined as being the time necessary for filling the inlet chamber 12, knowing the flow rate available at the inlet 40, more precisely after passage through the atomizer 50 and the distributor 30 placed in series with the port 11 in the feed phase. The time reference for the retraction phase of the piston 20 is, for its part, defined as being the more constraining of, on the one hand, the time necessary for filling the outlet chamber 14 knowing the flow rate available at the inlet 40, more precisely after passage through the atomizers 50 and 56 place in series with the port 17, and on the other hand the time necessary for emptying the inlet chamber 12 through the head losses of the distributor 30.

Thus, knowing the flow rate available from the source which supplies the inlet port 40, on the one hand, and the volume of the inlet chamber 12 of the hydraulic amplifier on the other hand, the distributor 30 is controlled on opening for a sufficient duration to ensure the feeding of the inlet chamber 12 by means of the available flow rate, respectively the feeding of the outlet chamber and the draining of the inlet chamber.

By way of an example, if the available flow rate at the port 40 is 10 l/mn and the volume of the inlet chamber 12 is 38.5 cc, it is known that the normal time to accomplish the stroke is approximately 2.3 seconds.

The reference time for the feeding phase will then be on the basis of 2.3 seconds.

If, however, at the end of these 2.3 seconds, the pressure measured at the atomizer 50 has not again become equal to the reference pressure when the piston 20 is immobile, which would indicate the end of the stroke of the piston 20, it is possible that the temperature is lower than during the measurement of the reference time.

The system then controls the assembly to determine a new reference time allowing the complete stroke of the piston 20 to be accomplished. Moreover, one can deduce the temperature from it and accordingly adjust the pressure deviation measured on the atomizers, the flow rate and therefore the control pressure.

Figure 6:
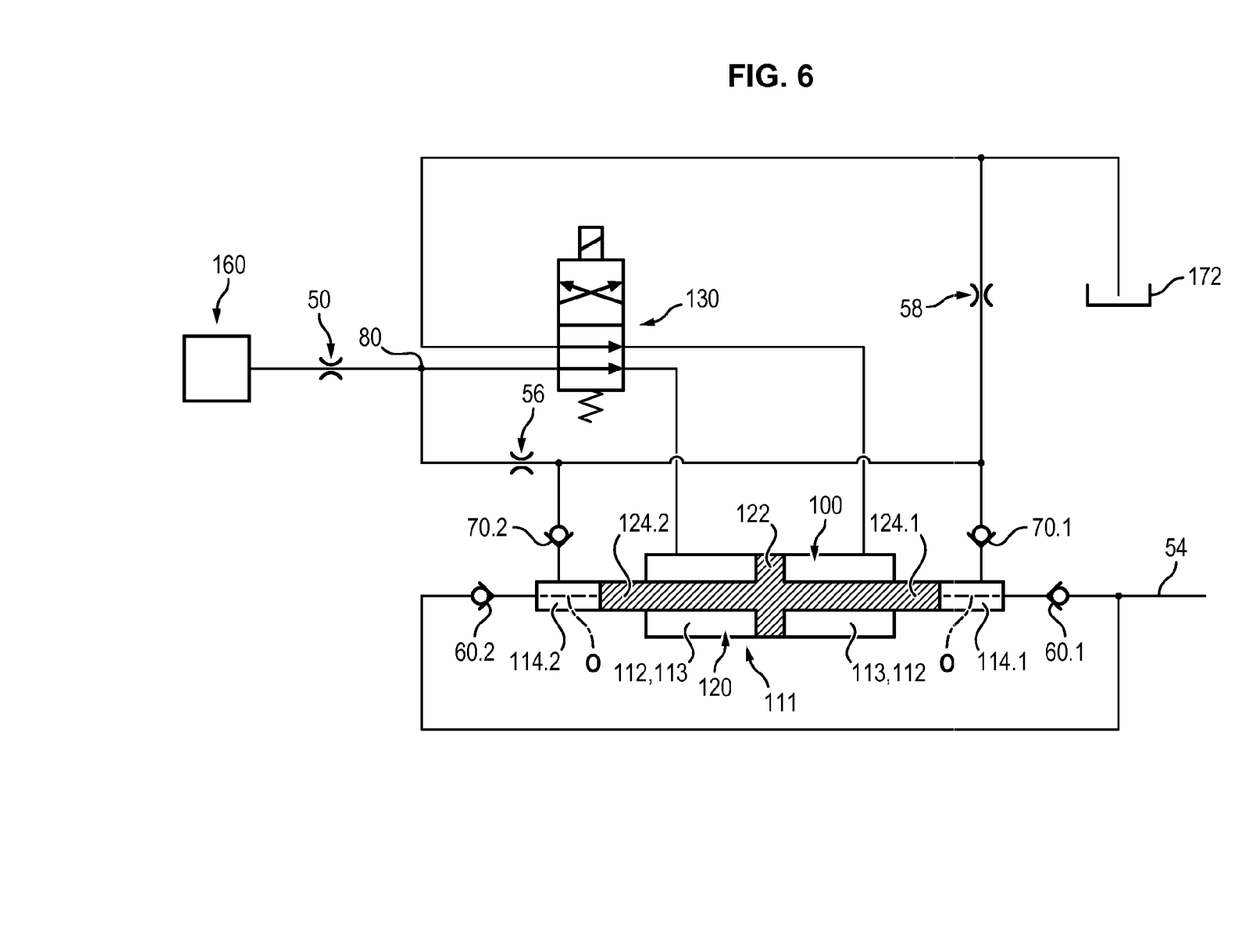
FIG. 6 shows another variant embodiment conforming to the present invention according to which the converter comprises two chambers operating in pressure augmentation respectively on the two movement phases, extension and return, of the piston.

Shown in FIG. 6 is a variant embodiment according to which the piston 120 works in increasing the pressure in movement both on its extension path and on its return path.

To this end, the converter device has symmetry relative to the median plane of the section 122 of the piston transverse to the movement axis O-O.

Thus, according to the embodiment shown in FIG. 6, the piston comprises a central section 122 with a large cross section, continued respectively on either side by two sections 124.1 and 124.2 with a smaller cross section.

The casing 100 has a central chamber 111 in which the section 122 with a large cross section of the piston 120 moves. The section 122 with the large cross section of the piston 120 thus divides the central chamber 111 into two sub-chambers which form respectively and alternately an inlet chamber 112 and an intermediate chamber 113 depending on the extension or return movement cycle of the piston.

Moreover, the casing 100 has, on either side of the central chamber 111, two lateral chambers forming alternately high pressure outlet chambers 114.1 and 114.2. The two lateral outlet chambers 114.1 and 114.2 accommodate respectively one of the sections 124.1 and 124.2 with a small cross section of the piston.

Observable in FIG. 6, are check valves 60.1 and 60.2 connected respectively to the outlet chambers 114.1 and 114.2 and leading to a pipe connected for example to the inlet of a pressure accumulator. The check valves 60.1 and 60.2 are conducting in the direction of the outlet chambers 114.1 and 114.2 toward the pressure accumulator.

Finally, a pressure source 160 connected by means of a four-way two-position distributor 130 and by means of a reducer or atomizer 50, alternately to one of the two sub-chambers of the main chamber 111, is shown schematically in FIG. 6. The distributor 130 connects the other sub-chamber of the main chamber 111 to a reservoir 172 at atmospheric pressure.

The outward stroke of the piston 120, selected arbitrarily to be from left to right, is obtained when the distributor 130 is placed in a position such that the left sub-chamber of the main chamber 111 is supplied by the pressure source 160. The volume of the left sub-chamber of the main chamber 111 expands and, on the contrary, the volumes of the right sub-chamber of the main chamber 111 and the right outlet chamber 114.1 decrease. This right outlet chamber 114.1 increases in pressure. The fluid under high pressure available in the right outlet chamber 114.1 is directed toward the outlet, for example toward the pressure accumulator via the check valve 60.1. Simultaneously, the left outlet chamber 14.2 expands. It is supplied by the check valve 70.2.

For the embodiment of FIG. 6, the restriction 56 is not indispensable. The measurement point 80 can be taken at the outlet of the atomizer 50. A single atomizer 50 is indeed necessary.

Symmetrically, the return stroke of the piston 120, arbitrarily selected to be from right to left, is obtained when the distributor 130 is placed in a position such that the right sub-chamber of the main chamber 111 is supplied by the pressure source 160. The volume of the right sub-chamber of the main chamber 111 expands and on the contrary the volumes of the left sub-chamber of the main chamber 111 and of the left outlet chamber 114.2 are reduced. This left outlet chamber 114.2 increases in pressure. The fluid under high pressure available in the left outlet chamber 114.2 is directed toward the outlet, for example the pressure accumulator, via the check valve 60.2. Simultaneously, the right outlet chamber 114.1 expands. It is supplied by the check valve 70.1 by means of the reduction 56.

The double chamber assembly illustrated in FIG. 6 allows regularizing the control and leakage flow rates and the outlet flow rate directed toward the outlet, for example toward the pressure accumulator. It also allows reducing by two the filling time of this accumulator.

The present invention offers numerous advantages relative to the prior art, particularly a smaller bulk, ease of machining and a smaller acquisition cost, a reduced number of parts and an improved sound level.

It will be noted in particular that the invention allows dispensing with the necessity of integrated into the casing 10 mechanical controlled piston end-of-stroke detection valves. The absence of such mechanical detection valves and therefore of the corresponding hydraulic distribution slide valves integrated with the amplifier 10, simplifies the machining of the body of the amplifier.

The electronic control conforming to the invention allows reducing the noise of the vibrations generated by changing the direction of the piston.

The device conforming to the present invention can be applied in particular to the feeding of a hydraulic braking system of a trailer with several axles.

The invention can apply for example to the hydraulic braking system proposed by the Applicant and described in document EP 3 103 691.

Regulatory provisions fix the volume of oil which must be supplied by a tractor to a trailer during braking at 140 cc for 0.6 s.

If the volume of the actuators of the trailer for braking is greater, which is generally the case for trailers with several axles, it is necessary to reconstitute the hydraulic volume under pressure on the trailer.

Generally, the only available pressure source is a line, the levels of which are fixed by regulation at 12 liters per minute and 15 bars minimum.

Thanks to a pressure amplifier conforming to the present invention, it is possible to transform the pressure into a pressure at 150 bars for a volume of approximately 500 cc stored in accumulators on the trailer.

Moreover, all the variant embodiments proposed in the context of the present invention allow limiting the number of components of the amplifier system relative to known amplifier devices of the prior art.

All the variant embodiment proposed in the context of the present invention also allow avoiding pressure pulses in the different openings of the system.

Of course, the present invention is not limited to the particular embodiments which have just been described, but extends to any variant conforming to its spirit.

It will be noted that, for the embodiment of FIG. 1, the atomizer 50 is suited for passing a large flow rate while the atomizer 56 is suited for passing a small flow rate.

The invention claimed is:

1. A hydraulic pressure amplifying device comprising:
a casing including two chambers, the chambers having different cross sections;
a staged piston housed in the chambers and comprising two piston sections, the piston sections having cross sections respectively matching the chambers; and
an electronic control configured for controlling a movement of the piston,
the electronic control being configured for estimating that the piston has reached an actual end-of-stroke position,
the device comprising no end-of-stroke sensor or mechanical stop for determining that the piston has reached an actual end-of-stroke position,
wherein the electronic control either:
is time base driven for estimating that the piston has reached an actual end-of-stroke position, or
includes a time reference driven control for estimating that the piston has reached an actual end-of-stroke position, or
is configured for
measuring a pressure on a port of the casing; and
generating a piston end-of-stroke signal when the measured pressure is a stable pressure over a predetermined period or a stable pressure equal to a reference pressure prevailing in an absence of movement of the piston,
wherein:
the chambers form first and second main chambers;
the first chamber forms a low-pressure inlet chamber which has a port configured for serving alternately as:
an inlet port for a feeding of the first chamber and
an outlet port for a discharge of the first chamber;
the second chamber forms a high-pressure outlet chamber which has an outlet port for a discharge of the second chamber and an inlet port for a feeding of the second chamber;
the casing comprising an intermediate chamber having a port configured for serving alternately as:
an inlet port for a feeding of the intermediate chamber, and
an outlet port for a discharge of the intermediate chamber;
the device comprising:
a control distributor formed of a three port, two position valve for controlling a feeding and a discharge of the first chamber and consequently a feeding and a discharge of the second chamber,
the control distributor having:
a first port,
a second port connected to the intermediate chamber and to a reservoir, and
a third port connected:
to the first chamber in a first position of the control distributor, the first port being connected to the third port, and
to the second port in a second position of the control distributor;
a first flow restriction connecting the first port to the fluid feed inlet;
a second flow restriction placed between an outlet of the first flow restriction and a pressure measurement point;
a third flow restriction placed between an outlet of the second flow restriction and an outlet connected to the reservoir;
a first check valve placed between the outlet of the second chamber and an outlet at which is available a high hydraulic pressure supplied by the device; and
a second check valve placed between the inlet of the second chamber and the pressure measurement point.

2. The device according to claim 1,
wherein the electronic control is configured for estimating that the piston has reached an actual end-of-stroke position by a sequence imposed by a time base, which predefines cyclically:
a duration period of feeding the inlet chamber,
then an imposed duration period of discharging the inlet chamber.

3. The device according to claim 1,
wherein the electronic control is configured to measure a pressure at an inlet of the inlet chamber for an extension phase of the piston.

4. The device according to claim 1,
wherein the electronic control is configured to measure a pressure at an inlet of the outlet chamber for a retraction phase of the piston.

5. The device according to claim 1, wherein the electronic control is configured to perform a pressure measurement by a flow restriction element.

6. The device according to claim 1,
wherein the electronic control is configured such that:
a time reference of a feed and piston extension phase is defined as being a time necessary for filling the inlet chamber knowing an available flow rate, and
a time reference of a piston retraction phase is defined as being a more constraining of:
a time necessary for filling the outlet chamber knowing an available flow rate and
a time necessary for emptying the inlet chamber through head losses of a distributor.

7. The device according to claim 1,
wherein the device comprising a distributor formed of a valve comprising a hydraulic counter-reaction, configured for prepositioning a pressure value applied to the inlet chamber.

8. The device according to claim 1,
wherein one of the two chambers forms a first pressure augmentation chamber,
the device comprising a second pressure augmentation chamber distinct from the two chambers,
the first and second pressure augmentation chambers being configured for operating in pressure augmentation respectively on extension and return strokes of the piston.

9. The device according to claim 8,
the piston sections comprising:
a large section, and
a small section having a cross section which is smaller than a cross section of the large section;
the device having symmetry relative to a median plane of the large section.

10. The device according to claim 8,
the piston comprising:
- a central section, and
- two side sections continuing the central section on either side of the central section respectively, the side sections having a cross section smaller than a cross section of the central section;

the device comprising:
a central chamber in which the central section moves, the central section dividing the central chamber into two sub-chambers forming respectively and alternately the inlet chamber and the intermediate chamber depending on an extension or return movement cycle of the piston; and
on either side of the central chamber first and second lateral chambers configured for forming alternately high-pressure outlet chambers, one of the first and second lateral chambers being the second chamber of the two chambers, the first and second lateral chambers respectively accommodating one of the side sections of the piston;

the device comprising:
check valves connected to the two sub-chambers;
check valves connected respectively to the first and second lateral chambers and leading to a pipe connected to an inlet of a pressure accumulator, conducting in a direction of the first and second lateral chambers toward the pressure accumulator;
a pressure source; and
a distributor configured for connecting alternately one of the two sub-chambers to the pressure source and respectively to a reservoir at atmospheric pressure.

11. A vehicle comprising a device conforming to claim 1.

12. A hydraulic pressure amplification method, the method using a split hydraulic pressure amplifying device comprising:
a casing including two chambers,
the chambers having different cross sections;
a staged piston housed in the chambers and comprising two piston sections, the piston sections having cross sections respectively matching the chambers; and
an electronic control configured for controlling a movement of the piston,
the electronic control being configured for estimating that the piston has reached an actual end-of-stroke position,
the device comprising no end-of-stroke sensor or mechanical stop for determining that the piston has reached an actual end-of-stroke position,
wherein the electronic control either:
is time base driven for estimating that the piston has reached an actual end-of-stroke position, or
includes a time reference driven control for estimating that the piston has reached an actual end-of-stroke position, or
is configured for
measuring a pressure on a port of the casing; and
generating a piston end-of-stroke signal when the measured pressure is a stable pressure over a predetermined period or a stable pressure equal to a reference pressure prevailing in an absence of movement of the piston,
wherein:
the chambers form first and second main chambers;
the first chamber forms a low-pressure inlet chamber which has a port configured for serving alternately as:
an inlet port for a feeding of the first chamber and
an outlet port for a discharge of the first chamber;
the second chamber forms a high-pressure outlet chamber which has an outlet port for a discharge of the second chamber and an inlet port for a feeding of the second chamber;
the casing comprising an intermediate chamber having a port configured for serving alternately as:
an inlet port for a feeding of the intermediate chamber, and
an outlet port for a discharge of the intermediate chamber;
the device comprising:
a control distributor formed of a three port, two position valve for controlling a feeding and a discharge of the first chamber and consequently a feeding and a discharge of the second chamber,
the control distributor having:
a first port,
a second port connected to the intermediate chamber and to a reservoir, and
a third port connected:
to the first chamber in a first position of the control distributor, the first port being connected to the third port, and
to the second port in a second position of the control distributor;
a first flow restriction connecting the first port to the fluid feed inlet;
a second flow restriction placed between an outlet of the first flow restriction and a pressure measurement point;
a third flow restriction placed between an outlet of the second flow restriction and an outlet connected to the reservoir;
a first check valve placed between the outlet of the second chamber and an outlet at which is available a high hydraulic pressure supplied by the device; and
a second check valve placed between the inlet of the second chamber and the pressure measurement point,
the method comprising the steps of
controlling movements of the piston by an electronic control; and
estimating with the electronic control that the piston has reached an actual endofstroke position, the estimating step being performed without using an end-of-stroke sensor or mechanical stop,
wherein the method either:
is time base driven when estimating that the piston has reached an actual end-of-stroke position, or
is time reference driven when estimating that the piston has reached an actual end-of-stroke position, or
comprises the steps of
measuring a pressure on a port of the casing; and
generating a piston end-of-stroke signal when the measured pressure is a stable pressure over a predetermined period or a stable pressure equal to a reference pressure prevailing in an absence of movement of the piston.

* * * * *